April 21, 1953 J. G. LINDEMAN 2,635,518
TOOL ATTACHMENT FOR TRACTORS
Filed Dec. 2, 1946 3 Sheets-Sheet 1

INVENTOR.
JESSE G. LINDEMAN
BY
ATTORNEY

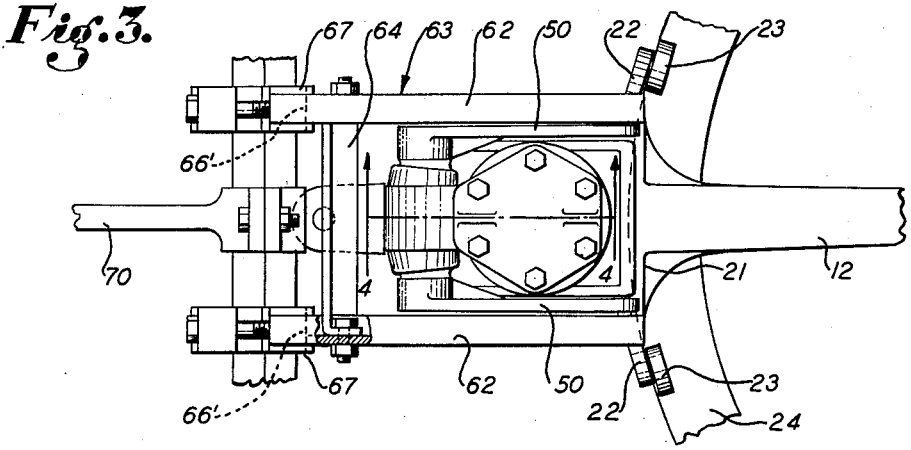
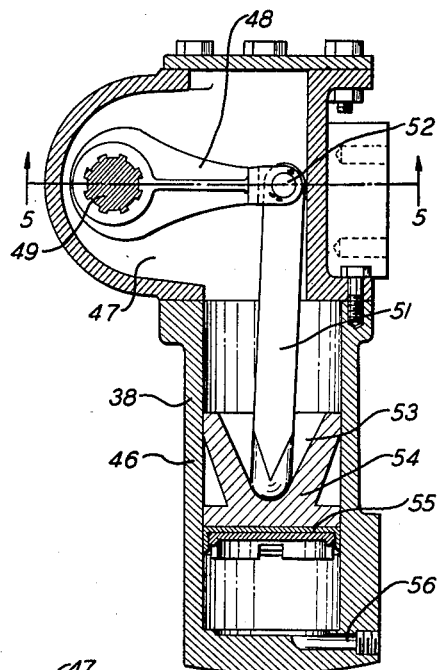
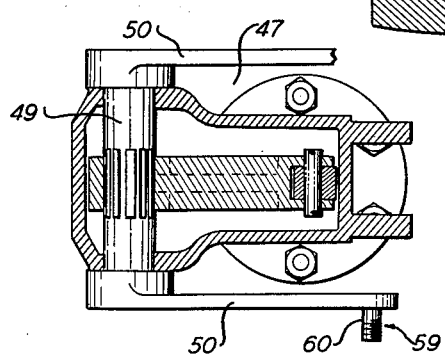

April 21, 1953  J. G. LINDEMAN  2,635,518
TOOL ATTACHMENT FOR TRACTORS
Filed Dec. 2, 1946  3 Sheets-Sheet 3

INVENTOR.
JESSE G. LINDEMAN
BY
ATTORNEY

Patented Apr. 21, 1953

2,635,518

UNITED STATES PATENT OFFICE 2,635,518

TOOL ATTACHMENT FOR TRACTORS

Jesse G. Lindeman, Yakima, Wash., assignor, by mesne assignments, to Deere & Company, Moline, Ill., a corporation of Illinois Application December 2, 1946, Serial No. 713,530

13 Claims. (Cl. 97—50)

My present invention relates to means for operating earth-working tools, and relates in particular to an attachment of simple and rugged character for tractors whereby desired tools may be quickly and firmly connected directly to the rear portion of the tractor and may be raised and lowered by the tractor operator occupying the driver's seat of the tractor.

It is an object of the invention to provide a tool attachment for tractors of the track laying type which will allow maximum ground clearance of the connecting mechanism and also maximum ground clearance of the tools when they are elevated, and yet secure a draft point with relation to the tractor when the tools are in operative position, low enough to eliminate the tendency of the tractor to swing upwardly around the rear portions of the treads when a heavy pull is exerted by the tractor. In this respect the invention avoids the serious danger existing in the use of ground working tools having a draft connection high enough at the back of the tractor to secure required ground clearance. It has been found, in the use of such old types of devices, that when the earth-working tool, such as a plow, for example, engages an obstruction so that it cannot be moved forwardly, the front end of the tractor will rise and if the clutch is not immediately disconnected will turn over backward, falling upon the operator if he fails to get out of its way.

It is a further object of the invention to provide a tool attachment for tractors having a draft bar which extends forwardly under the tractor from its rear end and is connected to the tractor at a point ahead of the rear extremity of the tractor treads. At the rear end of this draft bar there is a novel tool supporting mechanism for the connection of a tool or tools, this mechanism providing a positive connection of the tool means with the draft bar.

It is a further object of the invention to provide a tool attachment for tractors wherein the draft bar is connected to a pivot point underneath the tractor, ahead of its rear end, and is swingable in a horizontal plane, to permit turning or steering of the tractor with relation to the draft bar and the tool means carried thereby.

A further object of the invention is to provide a tool attachment for tractors having a novel linkage for the connection of tool means to the draft bar and having a simple and effective means for swinging this linkage so as to move the tool means between raised and lowered positions. A feature of this attachment is that the swingable parts of the linkage are so arranged with relation to the tool supporting arm that the rate of movement of the tool supporting arm increases as it swings upwardly and that it carries the tool or tools into raised position considerably higher than the lower face of the draft bar of the device, thereby providing ample ground clearance when the tools are supported in raised position.

A further object of the invention is to provide a means for raising and lowering a ground working tool at the back of the tractor, in such a manner that the angle of approach or planing angle of the tool changes as it is raised and lowered, in a characteristic manner, and when the tool is fully raised, it is shifted rearwardly from the vertical plane which it occupies when in working position.

It is a further object of the invention to provide in this tool attachment for tractors a novel linkage arrangement which acts to exert a force to move the tools outward to the lowest position to move the tool downward into the lowest position thereof permitted by an associated gauge wheel.

A further object of the invention is to provide in this tool attachment for tractors a cooperation of connecting means whereby the connection of the tool to the tractor has both lateral and vertical flexibility, so that the tractor may be turned laterally with relation to the tool, for steering purposes, and the tool may move vertically with relation to the tractor, thereby avoiding the placement of strains in the central parts of the tool attachment other than those normally incurred when the tool is pulled forwardly by a tractor operating on level ground.

Further objects and advantages of the invention may be brought out in the following part of the specification wherein specific description is utilized for the purpose of making a full disclosure of a preferred embodiment of the invention without limitation of the scope of the invention defined in the appended claims.

Referring to the drawings, which are for illustrative purposes only:

Fig. 3 is a fragmentary plan view corresponding to Fig. 2;

Fig. 4 is an enlarged fragmentary sectional view of the hydraulically actuated mechanism of the device;

Fig. 5 is a fragmentary sectional view taken as indicated by the line 5—5 of Fig. 4;

Figure 1:
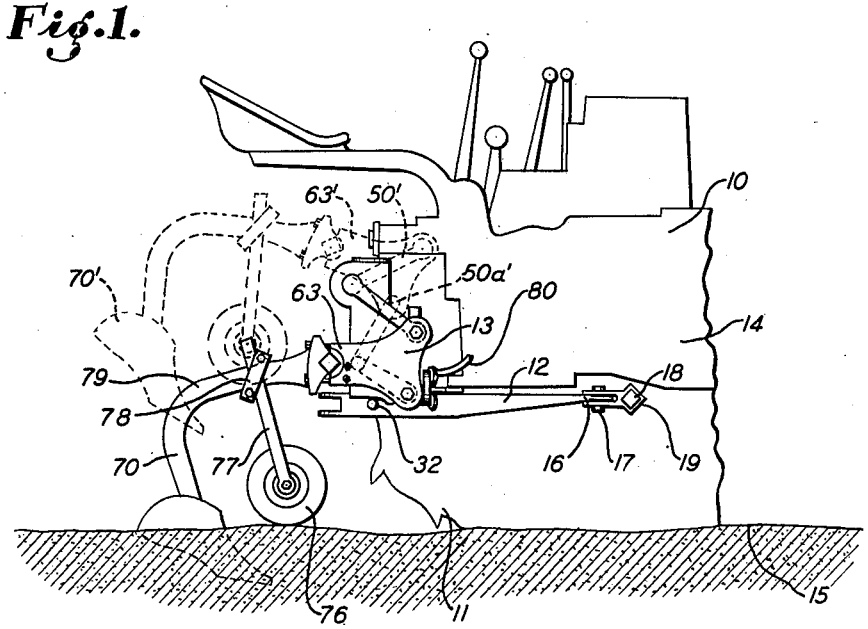
Fig. 1 is a side elevation of a preferred embodiment of my invention attached to a tractor, the rearward portion of which is shown in outline only, for the reason that the tractor itself forms no part of the present invention.

In Fig. 1, I have shown the outlines of the after portion of a tractor 10 of the track laying type, having tracks or treads 11 along the sides thereof for engagement with the ground. The present invention comprises a tool supporting and handling mechanism including a draft bar 12 and a tool supporting and/or operating mechanism 13 detachably connected to the rearward portion of the draft bar 12.

Figure 2:
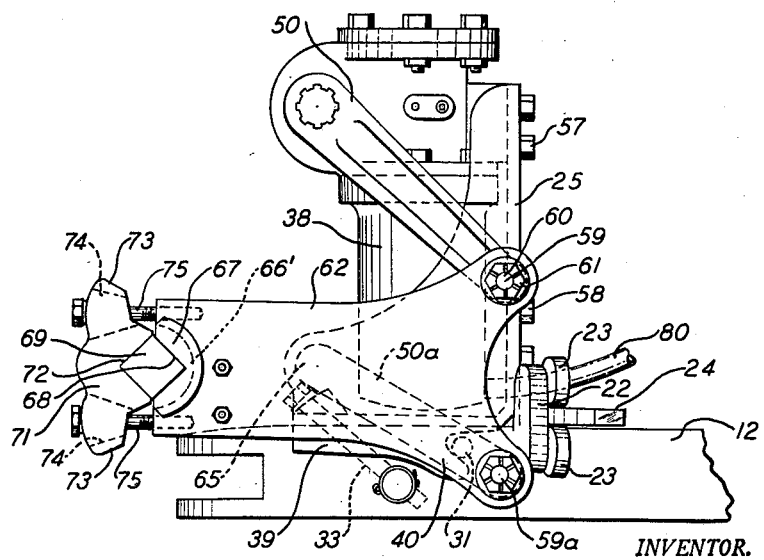
Fig. 2 is a fragmentary elevational view, to enlarged scale, showing the rear portion of the draft bar and the tool operating mechanism, with the tool bracket in a partly raised position.
Figure 7:
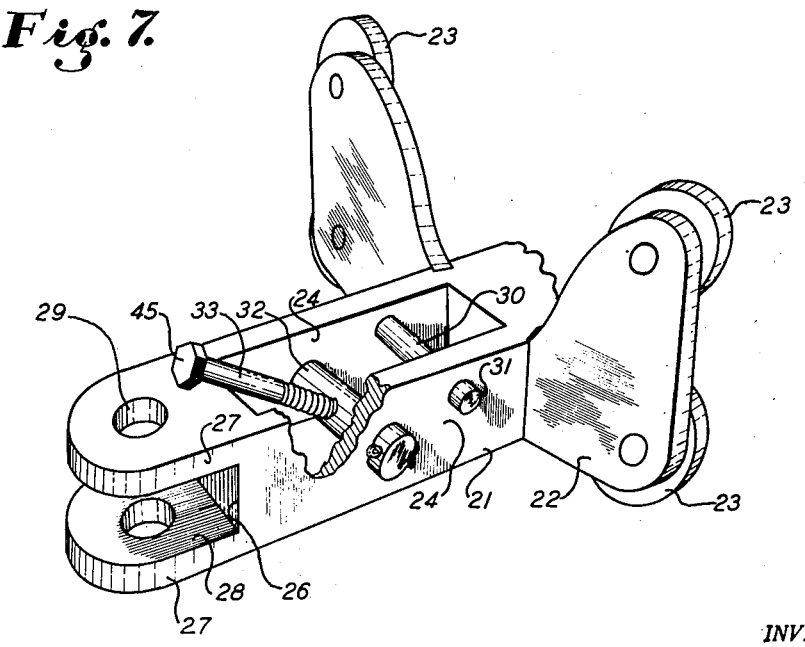
Fig. 7 is a partly sectioned perspective view of that portion of the draft bar which receives the frame member of Fig. 6 thereon.

The draft bar 12 extends forwardly under the rearward portion of the tractor body 14 in a position spaced from the ground 15 and close to the under face of the tractor body 14. The front end of the draft bar 12 is pivotally connected to an intermediate portion of the tractor, under the body 14 thereof, and accordingly ahead of the rear ends of the tracks 11 and below the horizontal plane defined by the axles of the tractor which support the track members 11. For accomplishing the pivotal connection of the draft bar 12 to the tractor, the forward end of the draft bar 12 has a horizontally flattened portion 16 through which a vertical hinge bolt 17 is passed to make pivotal connection with a shackle 18 connected to the central portion of a transverse bar 19 which extends in a position below the body 14 of the tractor 10. As shown in Figs. 2 and 3, the rearward portion of the draft bar 12 has an enlargement 21 from which walls 22 extend laterally to support left-hand and right-hand pairs of rollers 23, the rollers 23 of each pair being vertically spaced as shown in Fig. 2 so that each pair of rollers will engage the upper and lower faces of a laterally extending guide or track member 24a which is secured to the rear end of the tractor body. This track member 24a is curved so that its rear edge portion will follow an arc inscribed around the vertical axis defined by the hinge bolt 17, Fig. 1. As shown in Fig. 7, the enlargement 21 at the rearward end of the draft bar 12 comprises walls 24, vertically disposed and arranged in laterally spaced relation, the upper portions of these walls 24 being adapted to cooperate with the frame member 25 of the tool supporting mechanism, which is adapted to receive a tool support in the form of a bracket, as will be described below. The rear ends of the walls 24 connect to a lateral wall 26 from which vertically spaced horizontal walls 27 project rearwardly so as to provide a space 28 to receive the front end of a link by which a tool or vehicle may be connected to the draft bar 12. The walls 27 have vertically aligned openings 29 to receive a pin, not shown. As shown in Figs. 2 and 7, the pin 30 is extended transversely through the forward upper portions of the walls 24, with the opposite ends 31 of the pin 30 projecting from the external side faces of the walls 24 so that the ends 31 will provide lugs or shoulders which are faced downwardly or reversely with respect to the upper face of the enlargement 21 which cooperates with the lower face of the frame member 25. Aft of the pin 30 a bar 32 is extended across the walls 24, and into the center of this bar 32 a screw 33 is threaded. The screw 33 may be swung upwardly from the position in which it is shown in Fig. 7, the bar 32 rotating at such time.

Figure 6:
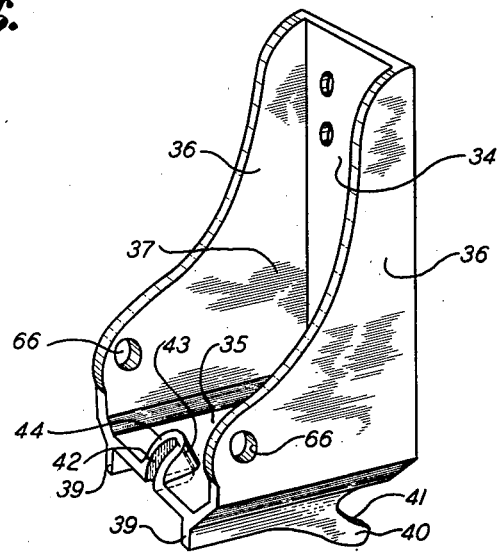
Fig. 6 is a perspective view of the detachable frame member of the invention.

The frame member 25, as shown in Fig. 6, consists of a body for carrying other parts of the tool supporting mechanism, as will be hereinafter described. The member 25 includes a vertical front wall 34, a bottom wall 35, and side walls 36, these walls defining a recess 37 adapted to receive a hydraulic motor 38. Webs 39 project downwardly from the lateral edges of the bottom 35. These webs 39 extend forwardly in such spaced relation to each other that they will project down across the upper portions of the external side faces of the walls 24, and at the forward ends of the webs 39 there are projections 40 having upwardly faced and sloping edge faces 41 to engage the lower portions of the pin ends 31, as shown in Fig. 2, when the member 25 is placed on the rearward portion of the enlargement 21 and then slid forwardly so that the projections 40 will pass under the pin ends 31. The bottom wall 35 of the member 25 has a rearwardly faced notch 42 adapted to receive the upper portion of the screw 33 when the member 25 is placed on the enlargement 21 of the draft bar 12 as shown in Fig. 2. This notch 42, as shown in Fig. 6, is defined by an upwardly projecting wall 43 providing a face 44 against which the head 45 of the screw 33 may be tightened when the screw 33 is swung upward to the position in which it is shown in dotted lines in Fig. 2. The force of the screw 33 then acts downwardly and forwardly so that one of its force components will hold the projections 40 tightly against the shoulders provided by the pin ends 31 and the other of its force components will hold the rearward portion of the bottom wall 35 firmly down against the upper face of the enlargement 21.

The hydraulic motor 38 of the tool operating mechanism 13, as best shown in Figs. 2 and 4, has a cylinder 46 and a casing 47 secured to the upper open end of the cylinder 46, this casing 47 having therein a lever 48 which is fixed on a transverse shaft 49, the ends of which shaft 49 project out of the casing 47 so as to receive levers 50 thereon. A thrust rod 51, Fig. 4, has its upper end hingedly connected by a pin 52 to the swinging end of the lever 48, and has its lower end engaging a recess 53 in the upper face of a piston 54. The piston 54 has sealing means 55 on its lower end, and when hydraulic pressure is delivered into the lower portion of the cylinder 46 through the fluid connection 56, the piston 54 will be forced upwardly and the levers 48 and 50 will be swung upwardly. The hydraulic motor means 38 is secured in the recess 37 of the member 25 by bolting it to the front wall 34 of the member 25. As shown in Fig. 2, screws 57 and 58 may be employed for this purpose.

The levers 50 are positioned so that they will sweep across the external faces of the side walls 36 of the member 25, and the swinging ends of the levers 50 are connected by bearing means 59, each including a threaded pin 60 and a nut 61, to the upper forward portions of the side plates 62 of a swingable tool supporting bracket 63 which, as shown in Fig. 3, has a transverse plate 64 for connecting the rearward portions of the side plates 62 thereof. The tool support or bracket 63, taken with the hydraulic motor 38, which carries the bracket 63 through the arms 50 and 50a, constitutes power actuated tool supporting and raising means or mechanism. Two levers 50a are provided on opposite sides of the member 25, these levers 50a having their rearward ends 65 pivoted in the openings 66, Fig. 6, in the lower rearward portions of the side walls 36. The forward ends of the levers 50a are connected to the lower forward portions of the bracket side plates 62 by bearing means 59a. The rear ends of the side plates 62 have therein arcuate depressions or sockets 66' to receive rocker members 67 which are arcuately formed so as to fit into the arcuate sockets 66'. In the rearward faces of the rocker members 67 there are transverse V-shaped notches 68 to receive adjacent faces of a square tool bar 69 on which a ground working tool, such as a plow 70, may be mounted. Cap plates 71 are provided, each of these cap plates having in the central portion thereof a forwardly faced V-shaped notch 72, Fig. 2, to engage the rearwardly disposed faces of the square tool bar 69. The upper and lower end portions 73 of the cap plates 71 have vertically elongated slots 74 through which screws 75 may pass. These screws 75 are threaded into the ends of the plates 62 above and below the arcuate sockets 66', to clamp the parts 62, 67, 69 and 71 together. Also, these screws 75 may be relatively adjusted inwardly and outwardly so as to cause the cap plates 71 to rotate around the horizontal axis of the tool bar 69. This rocking adjustment of the cap plates 71 will be transmitted through the walls of the notches 72 to the bar 69 and will be transmitted by the bar 69 to the rocker members 67. Accordingly, the tool bar 69 will be rotated on its axis and the plow 70 will be caused to swing upwardly or downwardly with relation to the tool supporting bracket 63. The plow 70 is provided with a depth gauge wheel 76, rotatably supported at the lower end of an arm 77, the upper end of which is attached by means of a clamp 78 to the shank 79 of the plow.

One of the important features of the invention is the placement of the levers 50 and 50a so that the swinging ends thereof project forwardly, and the disposing of the levers 50 and 50a in such relation that when they are swung upwardly from the lowered position thereof, in which they support the bracket 63 and the plow 70 in lowered position, to raised position as shown by dotted lines 50' and 50a', in Fig. 1, the bracket 63 will not only be raised but it will be rotated so as to increase the rate of upward movement of its rear end and thereby increase the rate of upward movement of the plow as it moves into its dotted line position 70', the results being that the plow will move rapidly to its raised position after it is disengaged from the soil, that the vertical movement of the plow 70 will be much greater than the vertical movement of the swinging ends of the levers 50 and 50a, and that the plow 70 will be raised from the ground to a position wherein its lower portion will be at least as high as the horizontal plane defined by the lower face of the draft bar 12.

As shown in Fig. 2, the levers or implement-supporting arms 50 and 50a are arranged so that the spacing between the forward or swinging ends thereof is less than the spacing between the pivoted or rear ends thereof, with the result that the angular relationship between the levers 50 and 50a changes as these levers are swung. Furthermore, the result of rocking the tool supporting bracket 63 forwardly as it is raised from its position shown in full lines in Fig. 1 to its dotted line position 63', is in part accomplished by making the lower levers 50a shorter than the upper levers 50.

A further feature of the invention is the placement of the levers 50 and 50a so that they slope downwardly and forwardly when the ground working tool, such as the plow 70, is near a position for engagement with the ground or is in engagement with the ground 15. The pull of the tool against the links or levers 50 and 50a is therefore along lines which will cause these levers to rotate downwardly in response to the force applied thereto, thereby tending to hold the tool in engagement with the ground, but permitting relative vertical movement between the tool and the tractor 10 as the tractor 10 moves the tool forwardly. At the same time there will be lateral adjustability between the tool and the tractor due to the hinging of the draft bar 12 for lateral swinging movement, thereby permitting freedom in steering the tractor, the tool following along behind the tractor without placing restraint on the steering movement thereof. When it is desired to lift the tool from working to raised position, hydraulic pressure is transmitted through the conduit 80 into the lower end of the cylinder, forcing the piston 54 upward, thereby rotating the levers 48 and 50 upwardly so as to elevate the bracket 63 and the tool or tools thereto attached.

I claim:

1. A tool mounting comprising a pair of laterally spaced brackets; a transverse tool bar fixed to said brackets, the latter being arranged to extend forwardly therefrom; two pairs of swingably mounted upper and lower arms pivotally connected at their forward ends to the forward portions of said brackets at generally vertically spaced points and at least the lower arms being disposed between and extending rearwardly alongside said laterally spaced brackets; means for swingably supporting the rear portions of said upper and lower arms; said brackets extending alongside said arms and rearwardly of the rear ends thereof; said transverse tool bar being fixed to the rear ends of said brackets; and means for swinging said arms so as to raise said tool bar, the lower arms being shorter than the upper arms, whereby said shorter arms will be displaced angularly through a greater extent than said upper arms and will therefore have a greater rearward component of movement than the corresponding movement of said upper arms, said lower arms being adapted thereby to impart additional lifting movement to said brackets and tool bar.

2. In a tool attachment for tractors of the character described, the combination of: a draft bar extending forwardly under the rearward portion of the tractor; means for connecting the forward portion of said draft bar to the intermediate portion of said tractor so that the rear end of said draft bar may have lateral swinging movement; a transverse track member for connection to the rear end of said tractor; wheels on the rearward portion of said draft bar engaging said track member and providing a rolling connection between said track member and said draft bar whereby said track member will support the rearward portion of said draft bar in all positions thereof; a tool support receiving frame member mounted on said draft bar adjacent said wheels whereby the weight of said frame member and associated parts is transmitted substantially directly to said track member, said tool support receiving frame member having an upwardly extending section lying adjacent the planes of said track-engaging wheels; and a power actuated tool supporting and raising mechanism attached directly to said upwardly extending section of said tool support receiving means.

3. In a tool attachment for tractors of the character described, the combination of: a draft bar extending forwardly under the rearward portion of the tractor; means for connecting the forward portion of said draft bar to the intermediate portion of said tractor so that the rear end of said draft bar may have lateral swinging movement; a transverse track member for connection to the rear end of said tractor; wheels on the rearward portion of said draft bar engaging said track member and providing a rolling connection between said track member and said draft bar whereby said track member will support the rearward portion of said draft bar in all positions thereof, said draft bar having lateral extensions supporting said wheels, and an enlarged portion immediately rearwardly of said extension, said enlarged portion including laterally spaced walls; and a tool supporting means including a vertically extending frame member having a lower portion seating between said laterally spaced walls and a generally vertically arranged tool shifting unit connected to the upper portion of said frame member.

4. In a tool attachment for tractors of the character described, the combination of: a draft bar extending forwardly under the rearward portion of the tractor; means for connecting the forward portion of said draft bar to the intermediate portion of said tractor so that the rear end of said draft bar may have lateral swinging movement; a transverse track member for connection to the rear end of said tractor; wheels on the rearward portion of said draft bar engaging said track member and providing a rolling connection between said track member and said draft bar whereby said track member will support the rearward portion of said draft bar in all positions thereof, said draft bar having lateral extensions supporting said wheels, and an enlarged portion immediately rearwardly of said extensions, said enlarged portions including laterally spaced walls and a swingably mounted attaching bolt carried by said laterally spaced walls; and a tool supporting means including a vertically extending frame member having a lower portion seating between said laterally spaced walls, a bolt-receiving socket for receiving said attaching bolt whereby tightening the latter clamps said frame member to said draft bar with the upper portion of said frame member adjacent said wheel-carrying extensions, and a generally vertically arranged tool shifting unit connected to the upper portion of said frame member.

5. In a tool attachment for tractors of the character described, the combination of: a draft bar extending forwardly under the rearward portion of the tractor; means for connecting the forward portion of said draft bar to the intermediate portion of said tractor so that the rear end of said draft bar may have lateral swinging movement; a transverse track member for connection to the rear end of said tractor; wheels on the rearward portion of said draft bar engaging said track member and providing a rolling connection between said track member and said draft bar whereby said track member will support the rearward portion of said draft bar in all positions thereof; said draft bar having lateral extensions supporting said wheels, and an enlarged portion immediately rearwardly of said extensions, said enlarged portions including laterally spaced walls, and a pin extending therebetween; and a tool supporting mechanism comprising a member having an upper section and a lower section including a part adapted to engage said pin for fixing said part to said draft bar and tool carrying means fixed to the upper section of said last mentioned member.

6. In a tool attachment for tractors of the character described, the combination of: a draft bar extending forwardly under the rearward portion of the tractor; means for connecting the forward portion of said draft bar to the intermediate portion of said tractor so that the rear end of said draft bar may have lateral swinging movement; means for supporting the rearward portion of said draft bar, the rear end of said draft bar having a vertically extending socket therein; and a tool supporting mechanism comprising a generally vertically extending frame member having at its lower end a part disposable in said socket, locking means in said socket engageable with said part for holding said frame member in place in said socket, means acting between said frame member and said draft bar for holding said locking means in engagement with said part, so as to clamp said frame member in said socket, and a tool carrier attachable to the upper end of said vertically extending frame member.

7. In a tool attachment for tractors of the character described, the combination of: a draft bar extending forwardly under the rearward portion of the tractor; means for supporting the rear end of the draft bar; means for connecting the forward portion of said draft bar to the intermediate portion of said tractor so that the rear end of said draft bar may have lateral swinging movement; a vertically disposed frame fixed at its lower end to said draft bar and extending upwardly therefrom; a generally vertically disposed cylinder mounted on said frame; a transverse shaft carried at the upper end of said cylinder; a piston in the lower part of the latter and operatively connected with said shaft to rock the shaft; and a pair of implement-supporting arms, one connected to each end of said shaft and disposed in a generally vertical plane at one side of said draft bar.

8. In a tool attachment for tractors of the character described, the combination of: a tool supporting part, a tool frame adapted to be mounted on the tractor; upper and lower levers connected at upper and lower points to said tool supporting part and at upper and lower points to said tool frame, said levers extending generally forwardly and downwardly from said tool frame when the tool is in engagement with the ground, and generally forwardly and upwardly from said tool frame when the tool is raised from the ground, and means connected to one of said levers for shifting the same upwardly, together with the other lever and said tool supporting part, said other lever being shorter than said one lever whereby at the end of said raising movement said other lever moves through a greater angle than said one lever and imparts angular movement to said tool additional to said raising movement.

9. In a tool attachment for tractors or the like: a draft member having a vertically extending socket provided with side walls; a pin extending transversely of said walls; a vertical frame member carrying means at its lower end to engage with said pin; swing bolt means carried by said walls and shiftable into engagement with the lower part of said vertical frame member for locking the latter against said pin; and tool-supporting means connected to the upper portion of said frame member.

10. In a tool attachment for tractors or the like: a draft member having a vertically extending socket provided with side walls, said side walls forming a socket therebetween; a frame member adapted to be carried by said draft member and having portions adapted to extend downwardly into said socket; swing bolt means carried by said walls and shiftable into engagement with the lower part of said frame member for locking the latter in said socket member; and tool-supporting means connected to the upper portion of said frame member.

11. The invention set forth in claim 10, further characterized by said tool-supporting means including a hydraulic device connected so as to raise said tool relative to said draft member, said hydraulic device being removable from said draft member with said frame member.

12. Means for connecting a tool bar to a tractor, comprising a pair of laterally spaced apart bracket members extending generally in a fore-and-aft direction and attachable at their rear ends to said tool bar, a pair of upper generally fore-and-aft extending laterally spaced apart levers, a pair of lower generally fore-and-aft extending laterally spaced apart levers, said upper and lower levers being disposed generally in the space between said bracket members, means pivotally connecting the forward ends of said upper and lower levers with the forward portions of said bracket members, a frame member attachable to the tractor and disposed generally between said upper and lower levers, and means pivotally connecting the rear portions of said levers with said frame member.

13. Connecting means as set forth in claim 12, further characterized by power actuated means carried by said frame member and connected with one pair of said levers for raising and lowering said bracket members.

JESSE G. LINDEMAN.

References Cited in the file of this patent

UNITED STATES PATENTS

| Number | Name | Date |
|---|---|---|
| 421,501 | Johnson | Feb. 18, 1890 |
| 838,796 | Milton | Dec. 18, 1906 |
| 1,397,748 | Towner | Nov. 22, 1921 |
| 1,518,444 | Paul | Dec. 9, 1924 |
| 1,780,503 | Paul | Nov. 4, 1930 |
| 2,077,942 | Lindgren | Apr. 20, 1937 |
| 2,350,587 | Charley et al. | June 6, 1944 |
| 2,385,895 | Tramontini | Oct. 2, 1945 |
| 2,444,321 | Wooldridge | June 29, 1948 |
| 2,476,439 | Court | July 19, 1949 |
| 2,521,503 | Clark | Sept. 5, 1950 |

FOREIGN PATENTS

| Number | Country | Date |
|---|---|---|
| 493,218 | France | Apr. 22, 1919 |
| 551,474 | Germany | June 1, 1932 |